US010625976B2

(12) United States Patent
Forsythe

(10) Patent No.: US 10,625,976 B2
(45) Date of Patent: Apr. 21, 2020

(54) GUIDE DEVICE

(71) Applicant: Pinnacle Product Solutions, Northville, MI (US)

(72) Inventor: Margarita Forsythe, Northville, MI (US)

(73) Assignee: Pinnacle Commercial Cleaning, Northville, MI (US)

( * ) Notice: Subject to any disclaimer, the term of this patent is extended or adjusted under 35 U.S.C. 154(b) by 30 days.

(21) Appl. No.: 15/980,035

(22) Filed: May 15, 2018

(65) Prior Publication Data

US 2018/0327213 A1    Nov. 15, 2018

Related U.S. Application Data

(60) Provisional application No. 62/506,354, filed on May 15, 2017.

(51) Int. Cl.
| | | |
|---|---|---|
| *B65H 57/26* | (2006.01) | |
| *A47L 9/00* | (2006.01) | |
| *B65H 57/00* | (2006.01) | |
| *H02G 3/04* | (2006.01) | |

(52) U.S. Cl.
CPC ............. *B65H 57/26* (2013.01); *A47L 9/00* (2013.01); *B65H 57/00* (2013.01); *B65H 2701/34* (2013.01); *H02G 3/0456* (2013.01)

(58) Field of Classification Search
CPC ........ B65H 57/00; B65H 57/02; B65H 57/26; B65H 2701/34
See application file for complete search history.

(56) References Cited

U.S. PATENT DOCUMENTS

| | | | | |
|---|---|---|---|---|
| 2,603,432 A | * | 7/1952 | Paulsen | B05B 15/00 242/615.2 |
| 2,814,460 A | * | 11/1957 | Marcolongo | B05B 15/00 242/615.2 |
| 3,097,827 A | * | 7/1963 | McDaniel | B60S 5/00 242/615.2 |
| 3,754,305 A | * | 8/1973 | Kline | B05B 15/00 248/75 |
| 4,404,925 A | * | 9/1983 | Louwsma | B05B 15/00 118/506 |
| 4,778,135 A | * | 10/1988 | Legard | B60T 3/00 188/32 |
| 4,836,432 A | * | 6/1989 | Violette | B05B 15/00 137/377 |

(Continued)

OTHER PUBLICATIONS

International Search Report for International Application PCT/US2018/032709, dated Aug. 10, 2018.

*Primary Examiner* — William E Dondero
(74) *Attorney, Agent, or Firm* — Burris Law, PLLC

(57) ABSTRACT

A guide device is provided that includes a base portion defining a platform and a tab, and a support member positioned between the platform and the tab and extending upwardly. In one form, the tab defines a continuous series of profiled geometric surfaces at an intersection between the tab and the support member, and the platform is adapted to receive an external component for stabilization. In another form, the tab defines at least one profiled geometric surface. The present disclosure further provides an assembly that includes an object having a ground interface and a guide device.

20 Claims, 12 Drawing Sheets

(56) References Cited

U.S. PATENT DOCUMENTS

| | | | | |
|---|---|---|---|---|
| 4,884,664 A * | 12/1989 | Berg | ............ | B60T 3/00 |
| | | | | 188/32 |
| 4,895,225 A * | 1/1990 | Parnell | ............ | B60T 3/00 |
| | | | | 138/110 |
| 5,427,209 A * | 6/1995 | Tannehill | ............ | B60S 3/00 |
| | | | | 188/32 |
| 5,427,339 A * | 6/1995 | Pauli | ............ | B05B 15/00 |
| | | | | 188/32 |
| D432,902 S * | 10/2000 | Thiel | ............ | D8/354 |
| 6,598,826 B1 * | 7/2003 | Therriault | ............ | B60S 5/04 |
| | | | | 242/157 R |
| 6,622,960 B2 * | 9/2003 | Hyde | ............ | B65H 57/00 |
| | | | | 137/377 |
| 6,708,918 B2 * | 3/2004 | Ferris | ............ | G02B 6/4459 |
| | | | | 174/97 |
| D492,928 S * | 7/2004 | Pond | ............ | D12/217 |
| D639,147 S * | 6/2011 | Surles | ............ | D8/356 |
| D769,105 S * | 10/2016 | Tomney | ............ | D12/217 |
| 9,624,067 B1 * | 4/2017 | Tomney | ............ | B65H 57/02 |
| D801,152 S * | 10/2017 | Bishop | ............ | D8/356 |
| D821,855 S * | 7/2018 | Liao | ............ | D8/356 |
| D842,209 S * | 3/2019 | Chiang | ............ | D12/213 |
| 2006/0101763 A1 | 5/2006 | Dohren | | |
| 2008/0236094 A1 | 10/2008 | Doda | | |
| 2011/0101047 A1 | 5/2011 | Vannebo | | |
| 2012/0023707 A1 | 2/2012 | Edwards | | |
| 2013/0193262 A1* | 8/2013 | Torres | ............ | B65H 57/04 |
| | | | | 242/615.2 |
| 2015/0308130 A1 | 10/2015 | Biec | | |
| 2016/0186449 A1 | 6/2016 | Lee | | |
| 2016/0229436 A1 | 8/2016 | Jones | | |

* cited by examiner

GUIDE DEVICE

CROSS-REFERENCE TO RELATED APPLICATIONS

This application claims the benefit of Provisional Application No. 62/506,354, filed on May 15, 2017, the contents of which are incorporated herein by reference in its entirety.

FIELD

The present disclosure relates to implements for use in cleaning office areas, and more particularly to devices that improve the efficiency of cleaning operations.

BACKGROUND

The statements in this section merely provide background information related to the present disclosure and may not constitute prior art.

A variety of power cleaning equipment is available for use in both residential and commercial cleaning services. Common power cleaning equipment may include, by way of example, dry vacuum cleaners, wet vacuum cleaners, buffers, scrubbers, extractors, and waxing machines, among others. Power cleaning equipment, as the name implies, are provided with power cords attached to the equipment in order to provide power for operation. The power cords may be manual or auto-retractable, and extension cords are also employed in order to reach areas far away from a power outlet.

These power cords may present challenges to a user of the power cleaning equipment. As the user moves the power cleaning equipment around an area to be cleaned, the power cords are dragged across the floor and tend to get caught or lodged under objects within the area, such as desks, cabinets, shelves, couches, and doors, among others. When the power cords get caught on an object, the user needs to locate where the cord is lodged and release the cord in order to continue cleaning, thereby wasting valuable time and resources. If the time wasted by a user having to stop their work, look for the lodged cord, and release the power cord were decreased, the cost of operating a cleaning business would decrease by lowering the amount of time the user is on-site cleaning. The gained time may also allow for more cleaning to be completed in a day or week.

These challenges with cleaning equipment power cords, among other accessories that may become inadvertently lodged, are addressed by the present disclosure.

SUMMARY

In one form, the present disclosure provides for a guide device comprising a base portion defining a platform and a tab, and a support member positioned between the platform and tab. The support member extends upwardly from the base portion. The tab defines a continuous series of profiled geometric surfaces at an intersection between the tab and the support member, and the platform is adapted to receive an external component for stabilization. The platform is adapted to receive an external component for stabilization.

In another form, an assembly is provided and comprises an object having a ground interface and a guide device. The guide device comprises a base portion defining a platform and a tab, and a support member positioned between the platform and the tab and extending upwardly. The tab defines a continuous series of profiled geometric surfaces at an intersection between the tab and the support member. The platform is adapted to receive the ground interface of the object for stabilization.

In yet another form, a guide device is provided that comprises a base portion defining a platform and a tab, and a support member positioned between the platform and tab and extending upwardly. The tab defines at least one profiled geometric surfaces at an intersection between the tab and the support member, and the platform is adapted to receive an external component for stabilization.

In other variations, the guide device may further comprise a stiffening rib extending between the platform and the support member. The guide device may be a single, unitary part, and/or made of a plastic material. The platform may be parallel to a ground surface, the upper surface of the platform may be inclined, and/or the tab may include an end extension defining a profiled geometric B-surface.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 1 is a perspective view of a guide device according to the principles of the present disclosure;

FIG. 2 a side view of the guide device of FIG. 1;

Figure 1:
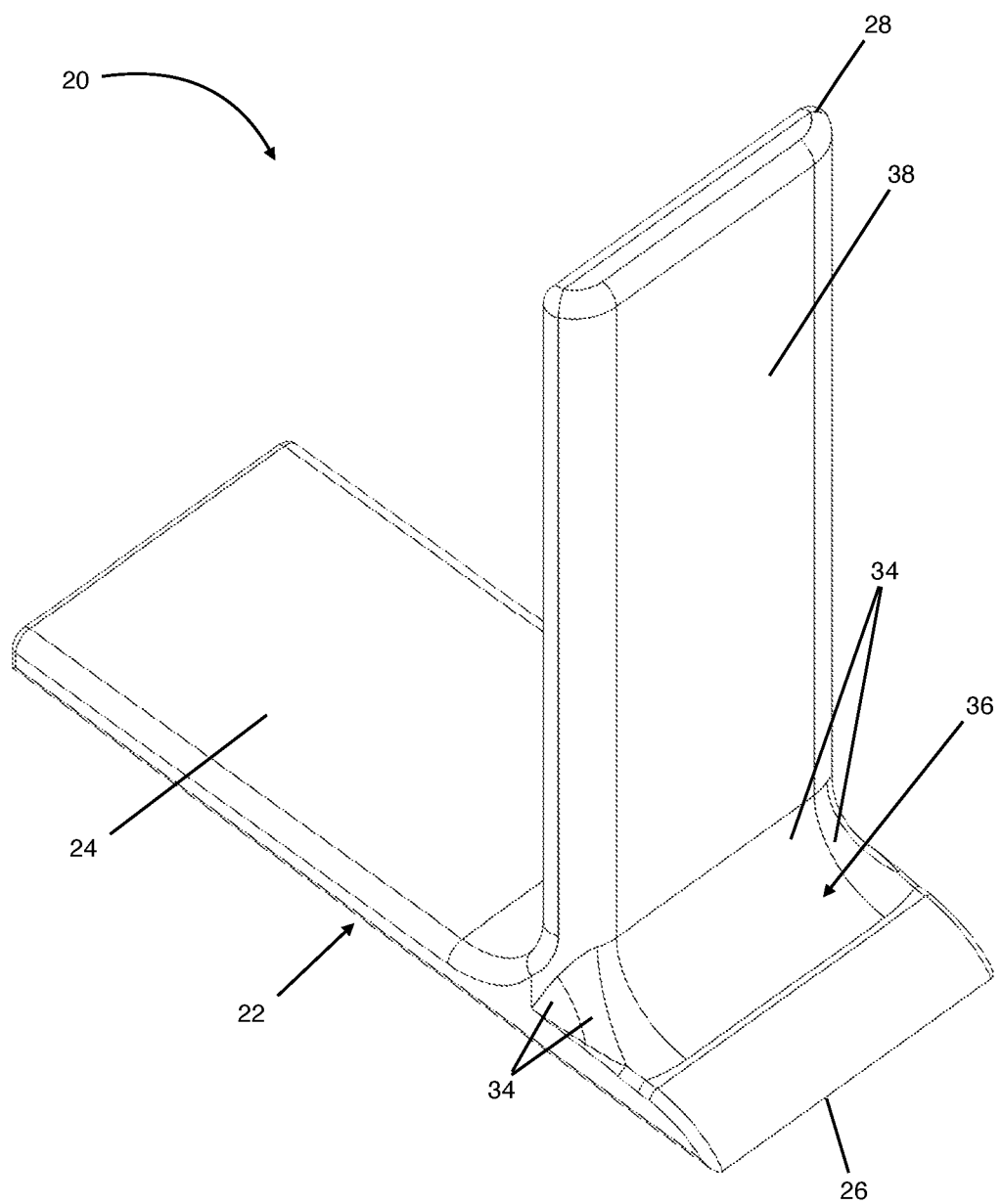

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 2:
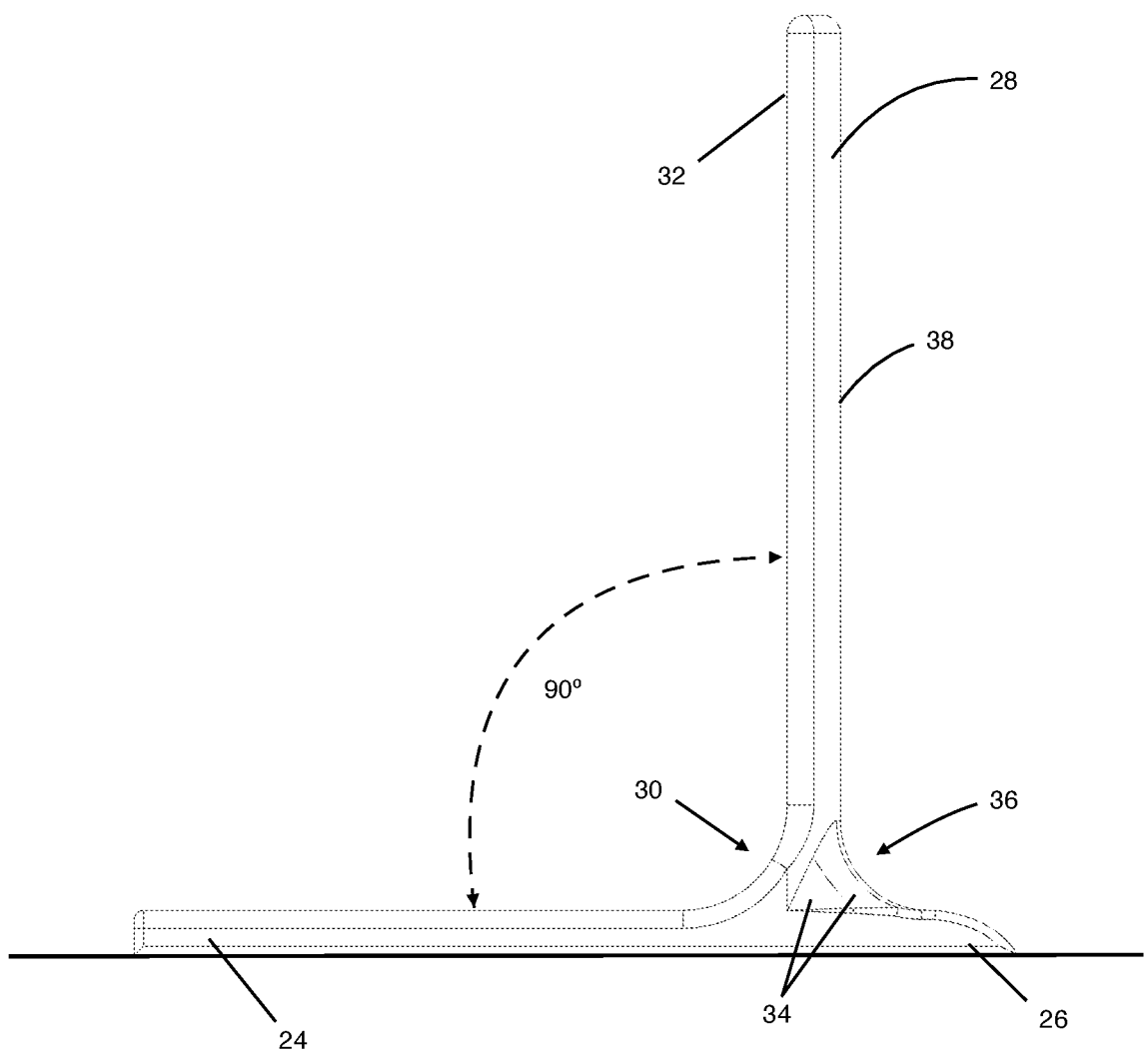

Referring to FIGS. 1 and 2, a guide device according to the principles of the present disclosure is illustrated and generally indicated by reference number 20. The guide device 20 comprises a base portion 22 defining a platform 24 and a tab 26, and a support member 28 positioned between the platform 24 and the tab 26. The support member 28 extends upwardly from the base portion 22 at an angle, for example at approximately 90° as shown. However, other angles may be employed while remaining within the scope of the present disclosure.

The platform 24 defines an intersection 30 between the platform 24 and a front side 32 of the support member 28. The platform 24 is adapted to receive an external component for stabilizing the guide device 20, which is described in greater detail below.

The tab 26 defines a continuous series of profiled geometric surfaces 34 at an intersection 36 between the tab 26 and an exterior side 38 of the support member 28 to improve the efficiency of cleaning operations. Generally, the continuous series of profiled geometric surfaces 34 define smooth edges to inhibit a cord from getting caught and/or stuck, as illustrated and described in greater detail below. For example, when a vacuum cord is dragged or moved around a room while cleaning, the cord is able to glide across the continuous series of profiled geometric surfaces 34 and avoid getting lodged under furniture or an object. Additionally, the guide device 20 also inhibits damaging the cord since the cord is guided around the furniture/object.

Figure 3:
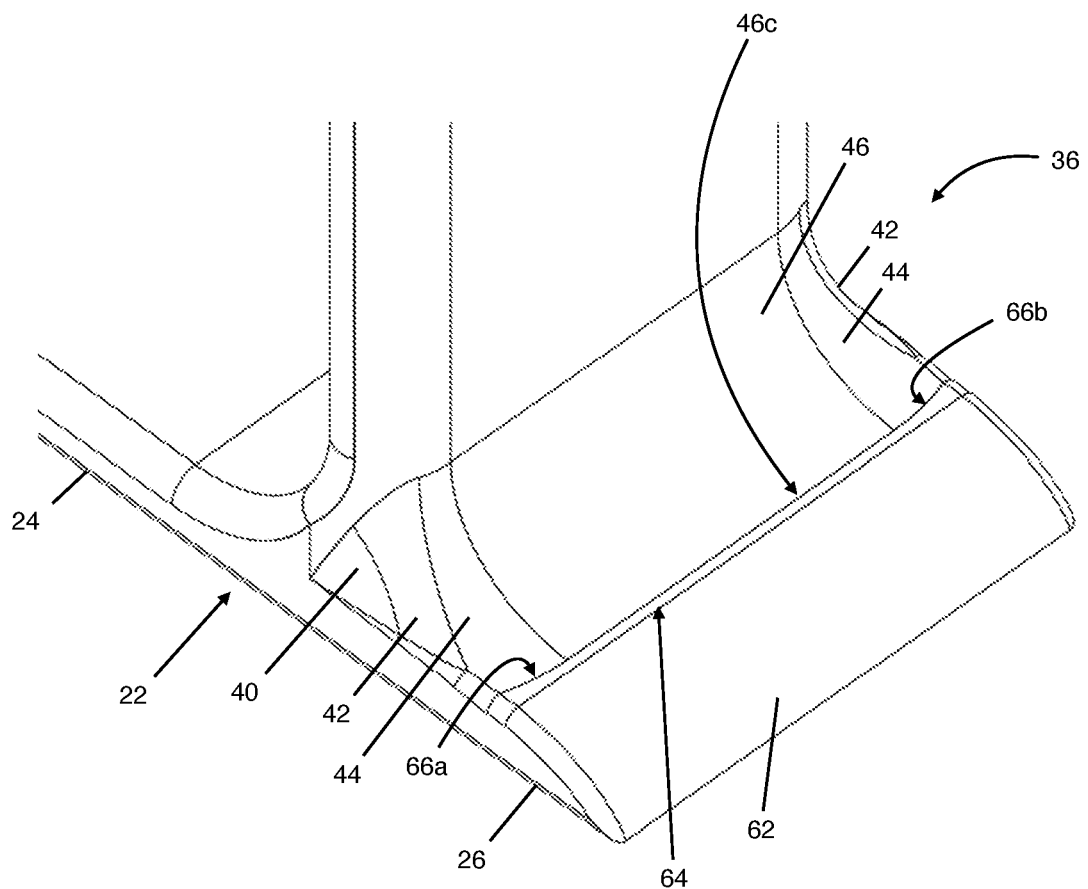
FIG. 3 is an enlarged partial perspective view of a tab of the guide device of FIG. 1.
Figure 4:
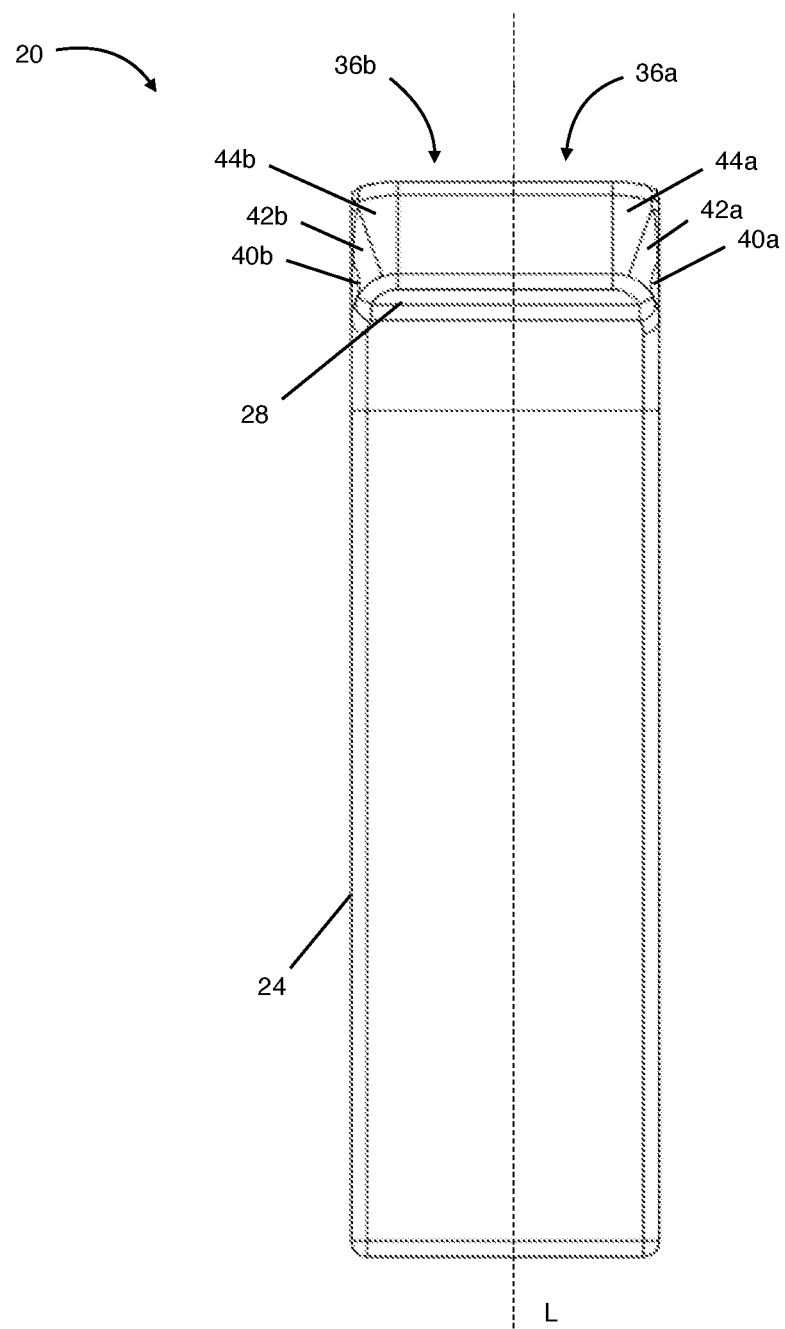
FIG. 4 is a top view of the guide device of FIG. 1.

Referring to FIGS. 3 and 4, the continuous series of profiled geometric surfaces 34 comprise highly engineered B-surfaces (or Bezier surfaces) 40, 42, 44, and 46. As shown, each B-surface 40, 42 and 44 defines a gentle curvature, and these B-surfaces collectively form the continuous series of profiled geometric surfaces 34. The transition between each of the B-surfaces is smooth, wherein the adjoining edges of each B-surface are tangent to each other. In this form, B-surfaces 40, 42 and 44 have a three-dimensional curvature, whereas B-surface 46 defines a two-dimensional curvature.

One side 36a of the intersection 36 comprises B-surfaces labeled 40a, 42a, and 44a and the other side 36b of the intersection 36 comprises B-surfaces labeled 40b, 42b, and 44b. In this form, each side 36a and 36b is symmetrical relative to a centerline L of the guide device 20. In other forms, each side may be asymmetrical while falling within the scope of the present disclosure. Also, it should be understood that discussion of one side of the guide device 20 is to be construed as referencing both sides 36a and 36b of the intersection 36 unless otherwise indicated.

Figure 5:
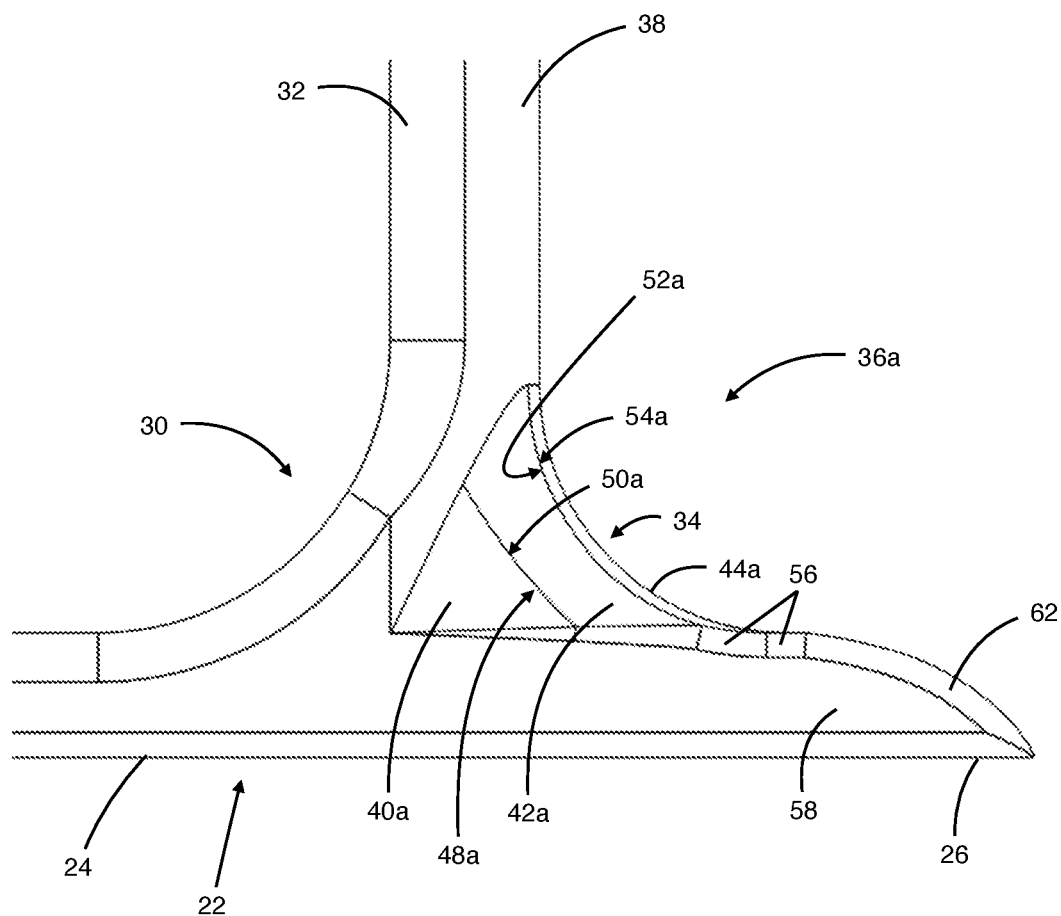
FIG. 5 is an enlarged partial right-side view of the tab of FIG. 4.
Figure 6:
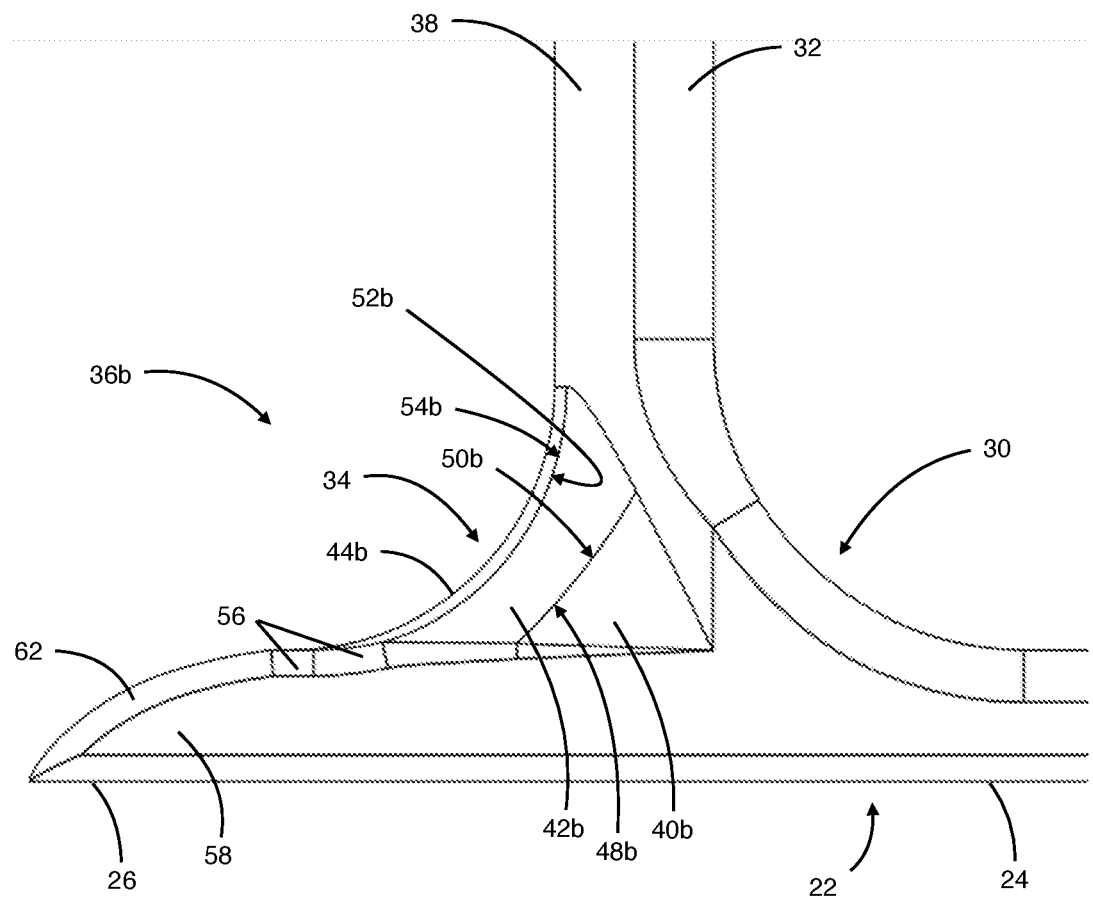
FIG. 6 is an enlarged partial left-side view of the tab of FIG. 4.

With additional reference to FIGS. 5 and 6, B-surfaces 40a and 40b define inner edges 48a and 48b that are tangent with an outer edge 50a and 50b of B-surfaces 42a and 42b, respectively, and B-surfaces 42a and 42b define inner edges 52a and 52b that are tangent with outer edges 54a and 54b of B-surfaces 44a and 44b, respectively. Collectively, the highly engineered B-surfaces 40, 42, 44, and 46 define the intersection 36 between the tab 26 and the exterior side 38 of the support member 28, which is the continuous series of profiled geometric surfaces 34.

In other forms, the intersection 36 may have any number of continuous series of profiled geometric surfaces while still remaining within the scope of the present disclosure. Therefore, the illustration of the intersection 36 having seven (7) continuous series of profiled geometric surfaces in this form should not be construed as limiting the scope of the present disclosure.

As further shown in FIGS. 3, 5 and 6, in another form, the tab 26 may further define additional smooth geometric surfaces 56 and 58 that provide additional guiding functions as well as reducing the number of sharp corners on the device 20. These additional geometric surfaces 56 and 58, among others as shown, provide a supplemental guiding function and are further referred to as "supplemental profiled geometric surfaces." Similarly, a smooth end extension 62 defining a profiled geometric B-surface further reduces the number of sharp edges of the guide device 20. In this form, an upper edge 64 of the end extension 62 tangentially transitions with the lower edges 66a, 66b and 46c of the B-surfaces 44a, 44b, and 46, respectively.

In one form, the guide device 20 may be a single, unitary part. Further, the guide device 20 in one form is a plastic material. However, it should be understood that the guide device 20 may be made from separate components assembled together and may be any other material suitable to function as a guide device as described herein while remaining within the scope of the present disclosure. Therefore, the illustration of a single, unitary part should not be construed as limiting the scope of the present disclosure.

Figure 7:
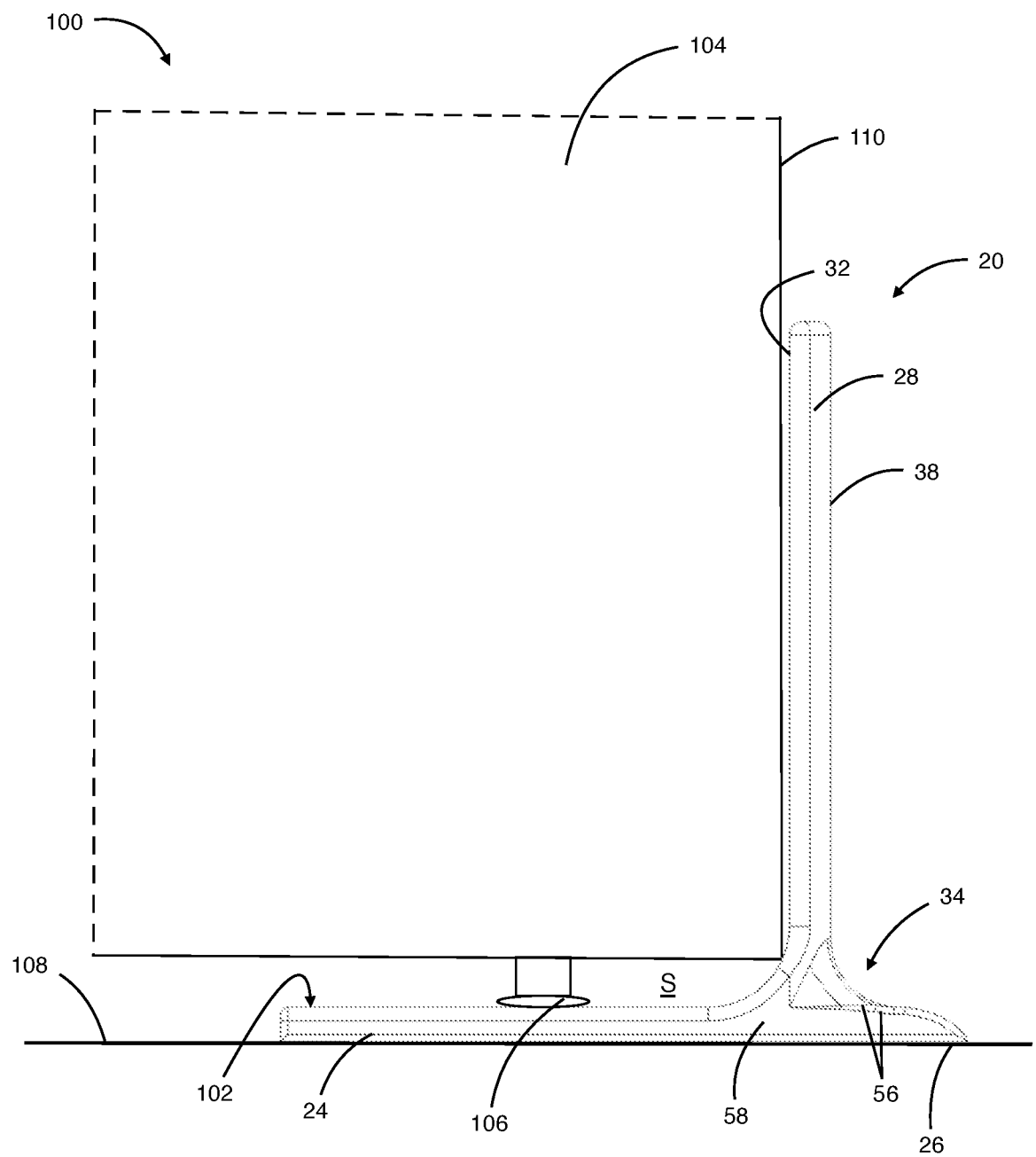
FIG. 7 is a side view of an assembly having a guide device according to the principles of the present disclosure installed under an object such as an office cubicle wall.

Referring now to FIG. 7, the guide device 20 is shown installed to/under an object such as a cubicle wall 104. In this form, an assembly 100 includes the guide device 20, the object 104, and a ground interface 106. The ground interface 106 in this form is a leg, which may be stationary or a leveling leg as known in the art. In this form, a top surface 102 of the platform 24 is parallel to a ground surface 108, and the guide device 20 is stabilized, or held in place, by the ground interface 106. The object 104 shown as a cubicle wall may be any of a number of objects, including by way of example, a desk, a cabinet, a piece of furniture or any other object that is in contact with the ground surface 108. The object 104 for example may contact the ground surface 108 by means of a leg, a leveling leg, or any other surface of the object 104 that is in contact with the ground. The top surface 102 of the platform 24 allows the ground interface 106 of the object 104 to rest on the top surface 102 of the platform 24 such that the object 104 stabilizes or holds the guide device 20 in place. The front side 32 of the support member 28 is adapted to engage a side surface 110 of the object 104 to further stabilize the guide device 20 in the event of any lateral movement of either the guide device 20 or the object 104.

The support member 28 is positioned between the platform 24 and the tab 26 to allow for proper engagement with the ground interface 106 of the object 104. As shown, the support member 28 is positioned such that the platform 24 extends beyond the support member 28 and is longer in length than the length of the tab 26. The present disclosure does not limit the platform 24 or tab 26 to a specific length, or ratio of lengths, and thus other lengths and ratios of lengths may be employed while still remaining within the scope of the present disclosure. In this form, the platform 24 is about 4" long, the tab 26 is about 1.5" long, and the support member 28 is about 4" high. The overall width of the guide device 20 in this form is about 2" wide. In other forms, the platform 24 and the tab 26 may be configured to extend beyond the support member 28 at different lengths or at the same length in order for proper engagement with an external component, or the ground interface 106 in this form. It should be understood that these dimensions are exemplary and should not be construed as limiting the scope of the present disclosure.

Although the support member 28 is shown on the outside of the object 104, it should be understood that this support member 28 may be internal to or integrated with the object 104 while remaining within the scope of the present disclosure.

Figure 8:
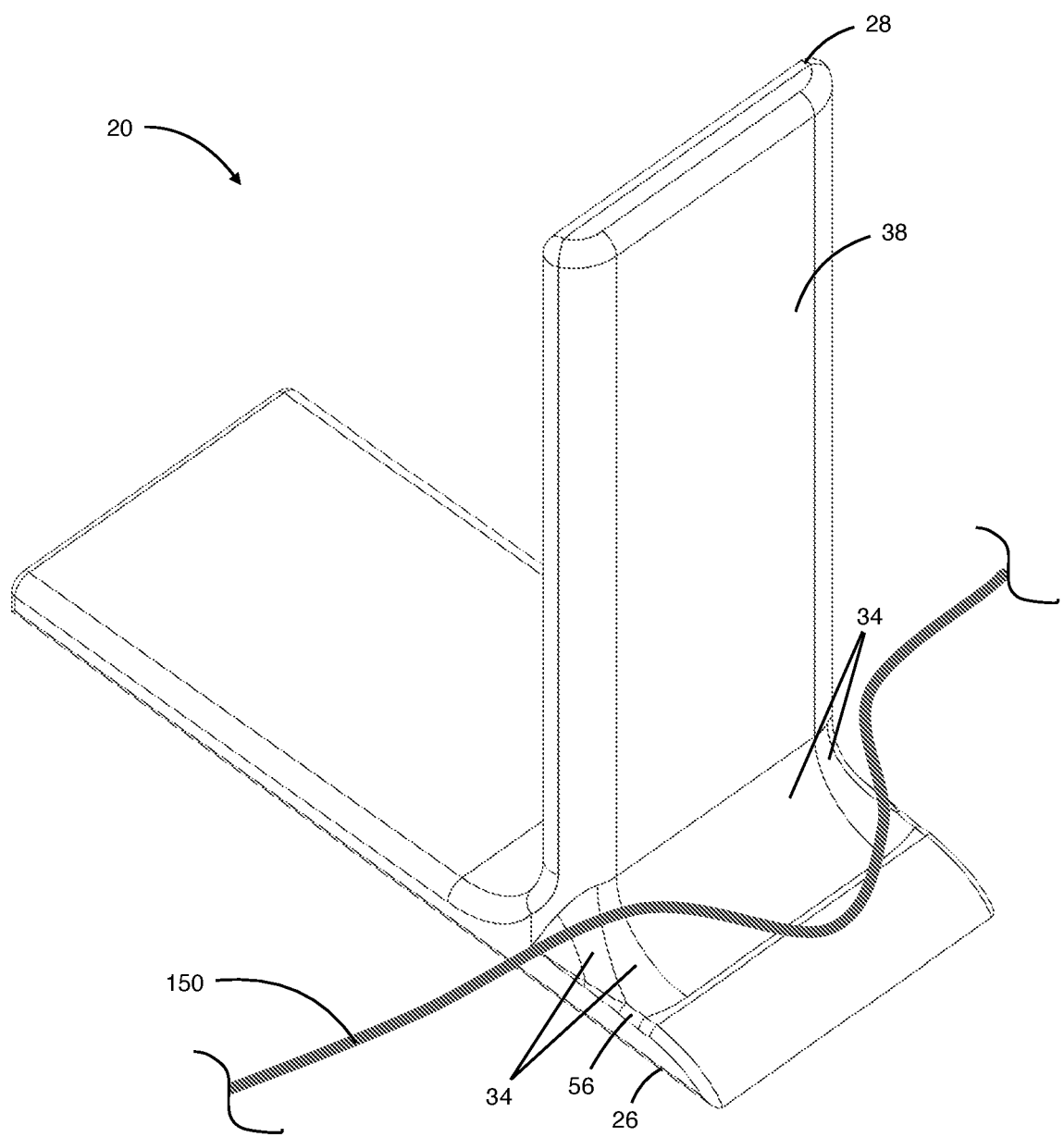
FIG. 8 is a perspective view of the guide device of FIG. 7 having a cord being guided around a continuous series of profiled geometric surfaces according to the principles of the present disclosure.

With reference to FIGS. 7 and 8, in operation, a cord 150 (such as a cord from a vacuum cleaner) being dragged or moved around a room may easily traverse the tab 26 due to the continuous series of profiled geometric surfaces 34 and the supplemental profiled geometric surfaces 56 and 58. The cord 150 remains outside of the object 104 as shown due to the innovative geometry and function of the guide device 20 and is inhibited from being caught or lodged under the object 104. Therefore, a user may continue their cleaning operations without being interrupted when the cord 150 would normally become caught or lodged under the object 104 in the space labeled "5," as shown in FIG. 7. Both the platform 24 and the support member 28 provide structural rigidity, while the continuous series of profiled geometric surfaces 34 guide the cord 150 during operation.

Figure 9:
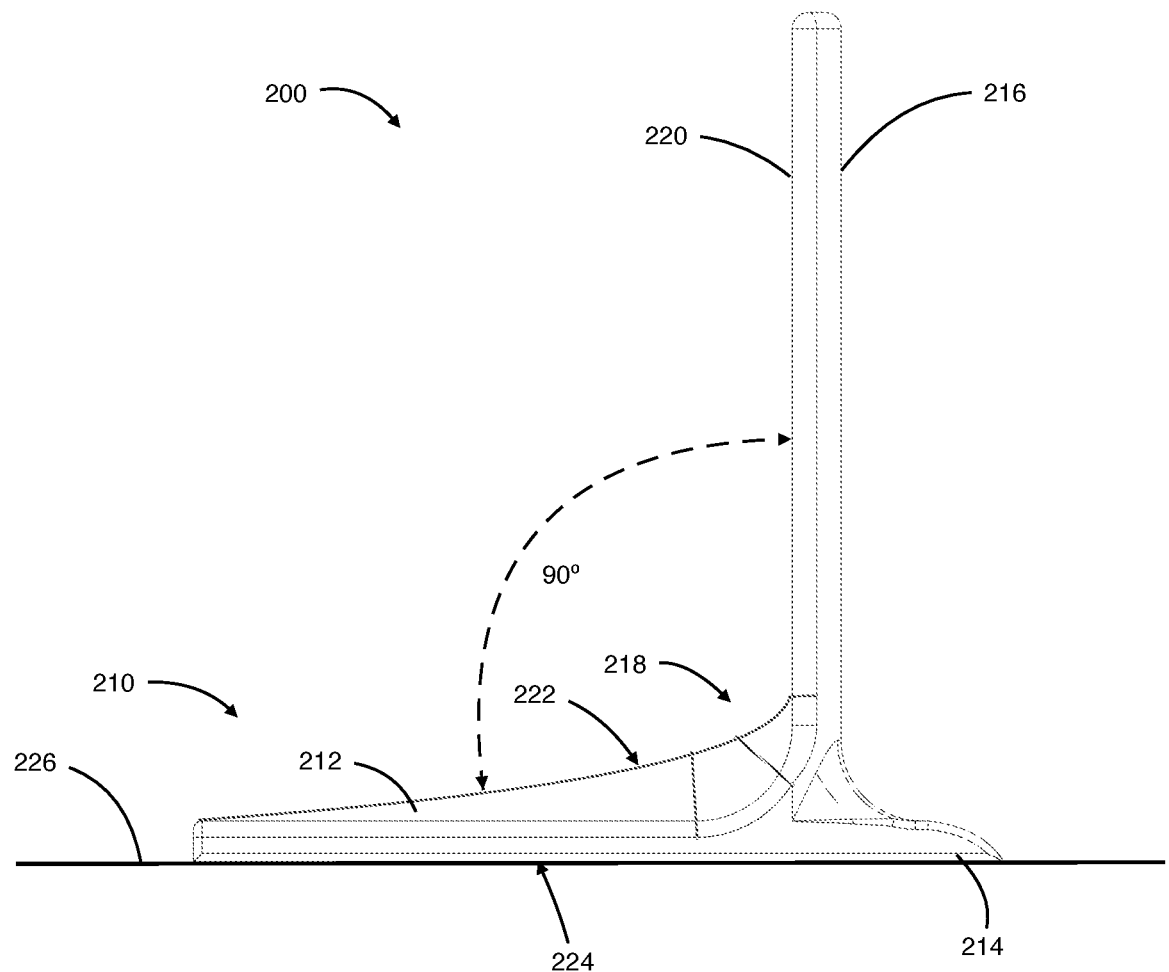
FIG. 9 is a side view of another form of a guide device according to the teachings of the present disclosure.

Referring now to FIG. 9, another form of a guide device 200 is illustrated according to the principles of the present disclosure. In this form, the guide device 200 includes substantially the same features as the guide device illustrated in FIGS. 1 through 8, such as a base portion 210 defining a platform 212 and a tab 214, and a support member 216 positioned between the platform 212 and the tab 214. However, this guide device 200 further includes a top surface 222 of the platform 212 that inclines in a direction towards an intersection 218. The support member 216 extends upwardly from the base portion 210 at an angle, for example at approximately 90° as shown, however other angles may be employed while remaining within the scope of the present disclosure. The platform 212 defines an intersection 218 between the platform 212 and a front side 220 the support member 216. The platform 212 is adapted to receive an external component for stabilizing the guide device 200.

The inclined platform 212 allows the guide device 200 to wedge between an external component (not shown) and a ground surface 226 to stabilize the guide device 200. The external component for example may be a door or any object that has a ground interface without legs, such as for example a filing cabinet without legs, among others. The guide device 200 is wedged between the external component and a ground surface 226 such that the external component is against the inclined top surface 222 of the platform 212 and the ground surface 226 is against a bottom surface 224 of the base portion 210 thereby stabilizing the guide device 200 in place.

In one form, the guide device 200 may be a single, unitary part. Further, the guide device 200 in one form is a plastic material. However, it should be understood that the guide device 200 may be made from separate components assembled together and may be any other material suitable to function as a guide device as described herein while remaining within the scope of the present disclosure. Therefore, the illustration of a single, unitary part should not be construed as limiting the scope of the present disclosure.

Figure 10:
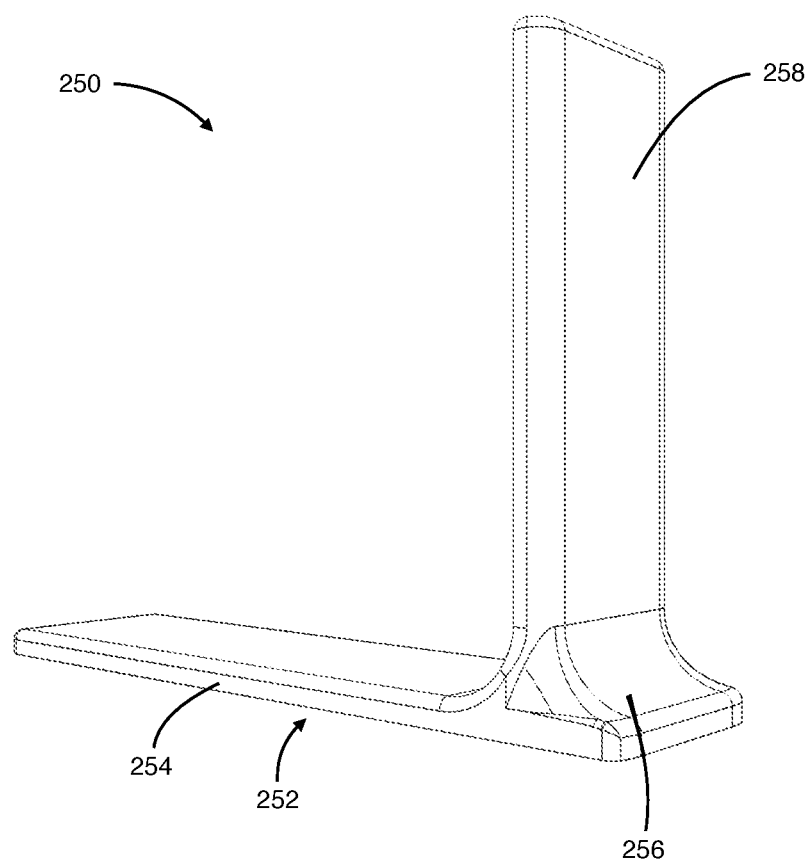
FIG. 10 is a rear perspective view illustrating another form of a tab of a guide device according to the teachings of the present disclosure.

Referring to FIG. 10, in yet another form of the present disclosure, another guide device 250 is illustrated according to the principles of the present disclosure. In this form, the guide device 250 includes substantially the same features as the guide device illustrated in FIGS. 1 through 8, such as a base portion 252 defining a platform 254 and a tab 256, and a support member 258 positioned between the platform 254 and the tab 256. However, this guide device 250 includes an alternate form of a tab 256 that is somewhat shorter while still having the continuous series of profiled geometric surfaces. In this form, the guide device 250, and more specifically its tab 256, would not protrude out from an object (104, FIG. 5), thereby creating less of an obstruction for cleaning operations.

Figure 11:
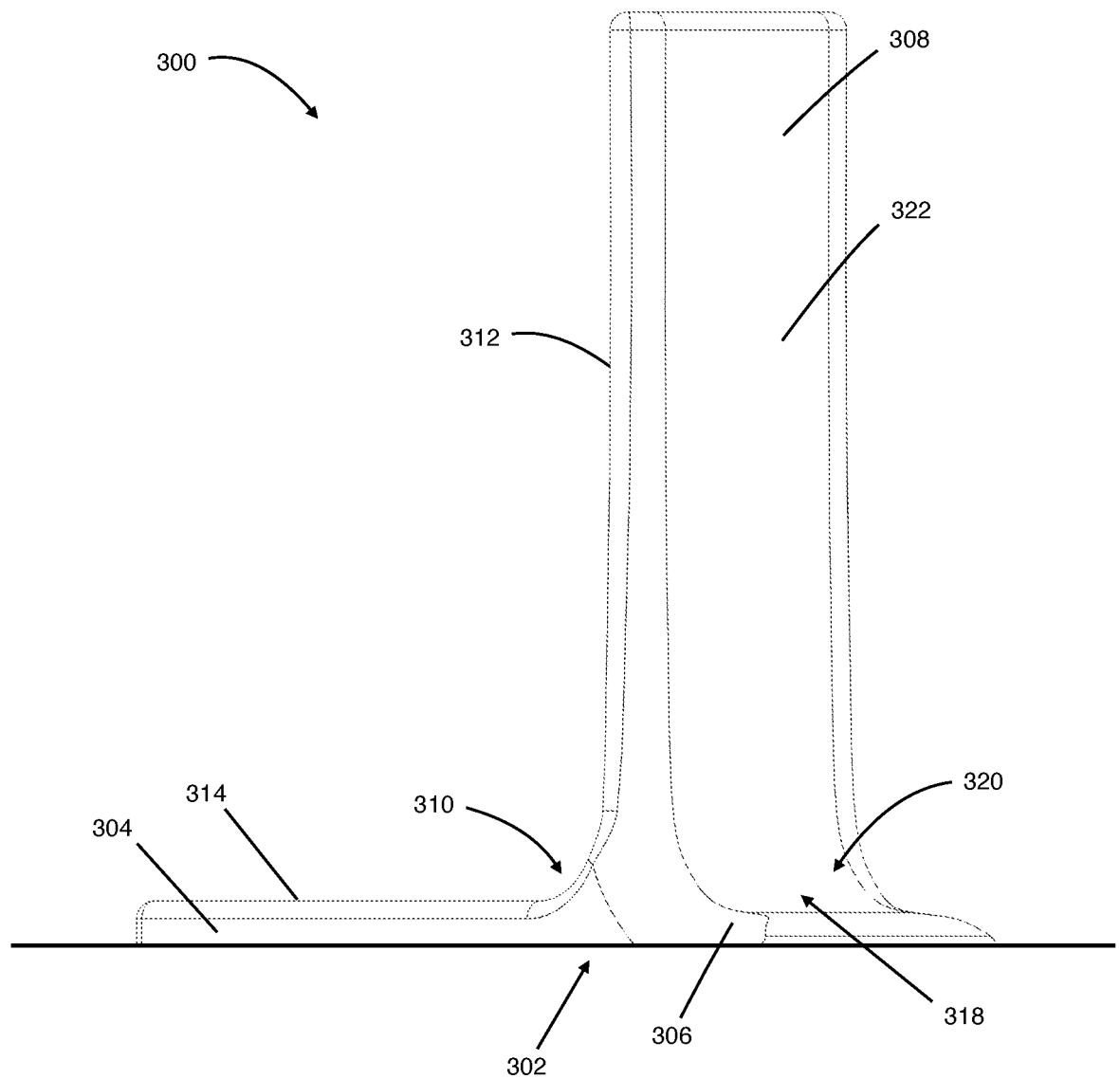
FIG. 11 is a rear perspective view illustrating another form of an intersection between a tab and a support member of a guide device according to the teachings of the present disclosure.

Referring to FIG. 11, in still another form of the present disclosure, a guide device 300 is illustrated having substantially the same features as the guide device 20 illustrated in FIG. 1. This guide device 300 further comprises a tab 306 that defines at least one profiled geometric surface 318 at an intersection 320 between the tab 306 and an exterior side 322 of a support member 308. This profiled geometric surface 318 is a radius with two-dimensional curvature. The guide device 300 further includes a base portion 302 defining a platform 304 and the tab 306, and a support member 308 positioned between the platform 304 and the tab 306. The platform 304 defines an intersection 310 between the platform 304 and a front side 312 the support member 308. The platform 304 is adapted to receive an external component for stabilizing the guide device 300.

As shown throughout, the various guide devices are a single, unitary part. However, it should be understood that the guide devices may be made from separate components assembled together and may be any material suitable to function as a guide device as described herein while remaining within the scope of the present disclosure. Therefore, the illustration of a single, unitary part should not be construed as limiting the scope of the present disclosure. Further, the various features of each form of the guide devices may be used in any combination while remaining within the scope of the present disclosure.

Figure 12:
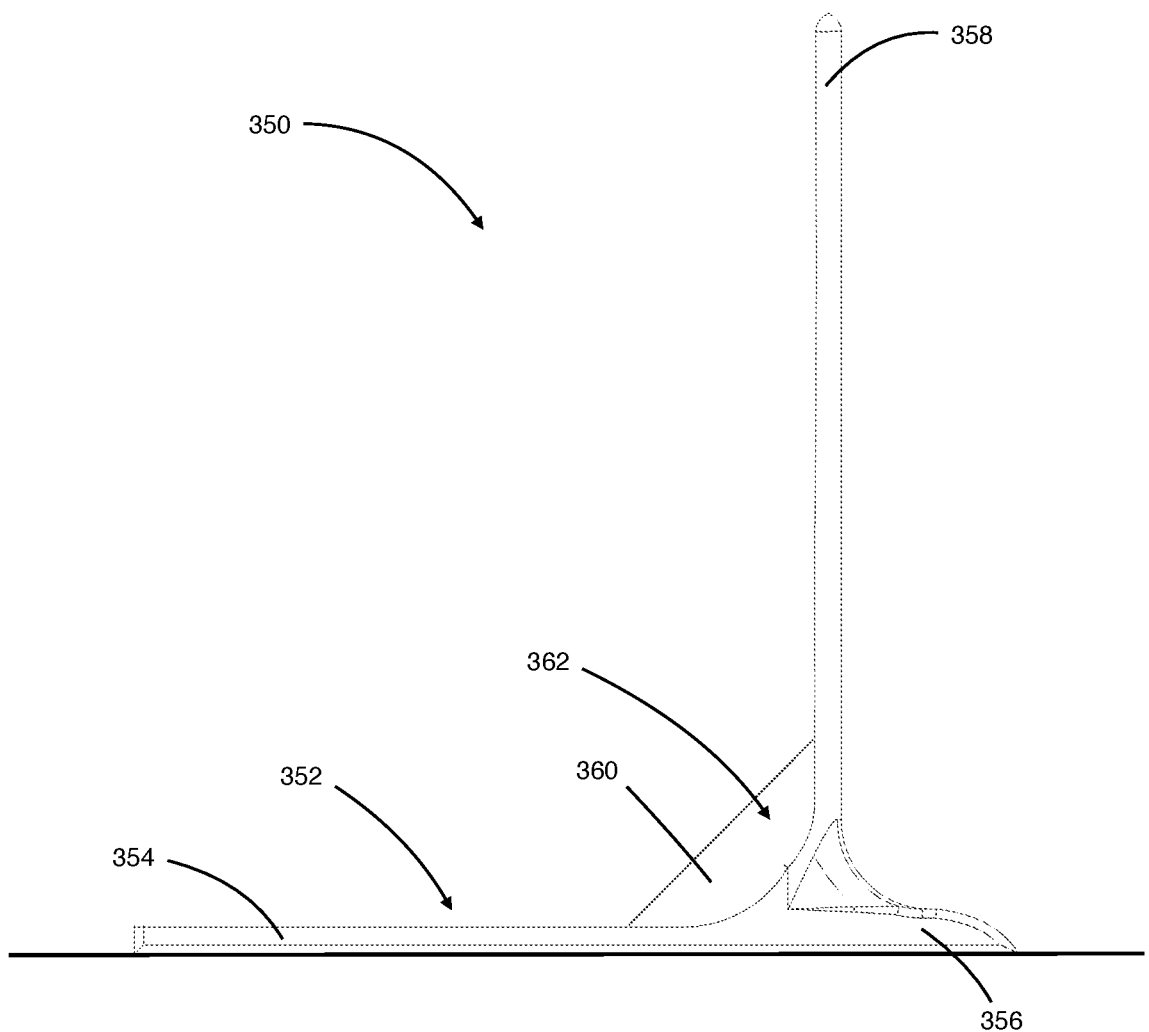
FIG. 12 is a side view of another form of a guide device according to the teaching of the present disclosure.

Referring to FIG. 12, in still another form of the present disclosure, another guide device 350 is illustrated according to the principles of the present disclosure. In this form, the guide device 350 includes substantially the same features as the guide device illustrated in FIGS. 1 through 8, such as a base portion 352 defining a platform 354 and a tab 356, and a support member 358 positioned between the platform 354 and the tab 356. However, this guide device 350 includes a stiffening rib 360 extending between the platform 354 and the support member 358. The stiffening rib 360 provides additional structural support when the device 350 has a thinner cross-section at the intersection 362 between the platform 354 and the support member 358. A thinner cross-section may be desired when the device 350 is installed in narrow areas. The installation of the guide device 350 is installed in substantially the same way as illustrated in FIG. 7.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A guide device comprising:
   a base portion defining a platform and a tab; and
   a support member positioned between the platform and the tab and extending upwardly,
   wherein the tab defines a continuous series of profiled geometric surfaces at an intersection between the tab and the support member, and the platform is adapted to receive an external component for stabilization.

2. The guide device according to claim 1 further comprising a stiffening rib extending between the platform and the support member.

3. The guide device according to claim 1, wherein the guide device is made of a plastic material.

4. The guide device according to claim 1, wherein the platform is parallel to a ground surface.

5. The guide device according to claim 1, wherein an upper surface of the platform is inclined.

6. The guide device according to claim 1, wherein the tab includes an end extension defining a profiled geometric B-surface.

7. The guide device according to claim 1, wherein the guide device is a single, unitary part.

8. An assembly comprising:
   an object having a ground interface; and
   a guide device comprising:
      a base portion defining a platform and a tab; and
      a support member positioned between the platform and the tab and extending upwardly,
   wherein the tab defines a continuous series of profiled geometric surfaces at an intersection between the tab and the support member, and the platform is adapted to receive the ground interface of the object for stabilization.

9. The guide device according to claim 8 further comprising a stiffening rib extending between the platform and the support member.

10. The guide device according to claim 8, wherein the guide device is made of a plastic material.

11. The guide device according to claim 8, wherein the platform is parallel to a ground surface.

12. The guide device according to claim 8, wherein an upper surface of the platform is inclined.

13. The guide device according to claim 8, wherein the tab includes an end extension defining a profiled geometric B-surface.

14. The guide device according to claim 8 wherein the guide device is a single, unitary part.

15. A guide device comprising:
   a base portion defining a platform and a tab; and
   a support member positioned between the platform and the tab and extending upwardly,
   wherein the tab defines at least one profiled geometric surface extending upwardly and toward the support member at an intersection between the tab and the support member, and the platform is adapted to receive an external component for stabilization.

16. The guide device according to claim 15 further comprising a stiffening rib extending between the platform and the support member.

17. The guide device according to claim 15, wherein the guide device is made of a plastic material.

18. The guide device according to claim 15, wherein an upper surface of the platform is inclined.

19. The guide device according to claim 15, wherein the tab includes an end extension defining a profiled geometric B-surface.

20. The guide device according to claim 15, wherein the guide device is a single, unitary part.

* * * * *